M. A. LEMERCIER.
DETACHABLE RIM FOR PNEUMATIC OR OTHER TIRES.
APPLICATION FILED FEB. 2, 1906.
932,876.
Patented Aug. 31, 1909.
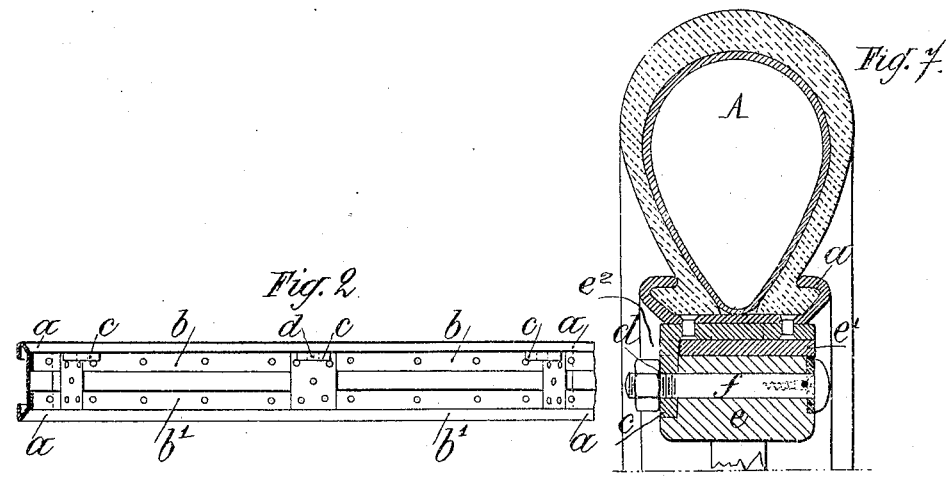
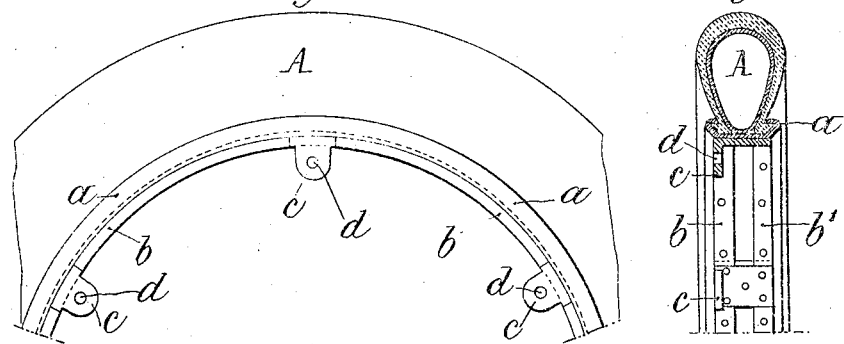
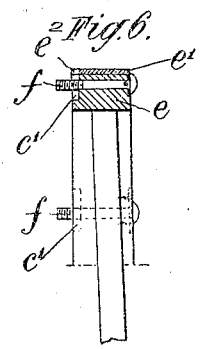
WITNESSES
W. M. Avery
W. Harrison
INVENTOR
Marcel Adolphe Lemercier
BY
Munn & Co
ATTORNEYS

UNITED STATES PATENT OFFICE.

MARCEL ADOLPHE LEMERCIER, OF PARIS, FRANCE, ASSIGNOR TO SOCIETÉ DES JANTES AMOVIBLES, OF PARIS, FRANCE.

DETACHABLE RIM FOR PNEUMATIC OR OTHER TIRES.

932,876. Specification of Letters Patent. Patented Aug. 31, 1909.

Application filed February 2, 1906. Serial No. 299,151.

*To all whom it may concern:*

Be it known that I, MARCEL ADOLPHE LEMERCIER, a citizen of the French Republic, and residing at 112 Rue de Richelieu, Paris, France, (whose postal address is the same,) have invented a certain new and useful Improvement in Detachable Rims for Pneumatic or other Tires, of which the following is a full, clear, and exact description and for which I have applied for Letters Patent in France, dated May 25, 1905.

This invention relates to a detachable rim which allows a complete pneumatic tire fully inflated, or a solid indiarubber tire, mounted on said detachable rim to be attached to or detached from the wheel of a vehicle with great rapidity.

The invention is described hereafter with reference to the annexed drawing in which:—

Figure 1 is a part elevation of the sliding rim forming the subject of my invention, and provided with a pneumatic tire. Fig. 2 is an inverted plan or bottom view of the structure shown in Fig. 1. Fig. 3 is a transverse section of the same detachable rim. Fig. 4 represents in part elevation, a wheel constructed to receive the rim in question. Fig. 5 is a corresponding plan. Fig. 6 is a cross section of the same wheel. Fig. 7 shows, in cross section and on a larger scale, the complete detachable rim and tire mounted on the wheel felly.

As shown in Figs. 1 to 3, the detachable rim $a$ is provided with a pneumatic tire A, secured upon the rim and inflated in the ordinary manner; on the side of the rim facing the center, it carries two cylindrical sole-plates $b$, $b'$ arranged along its seating edges, each sole plate being preferably formed of a plurality of segments as shown. On the side of the outer ring or sole-plate $b$, i. e. away from the body of the vehicle, are a certain number of ears or lugs $c$ which may be integral with the segments of the said sole plate but preferably are formed separately with feet arranged across the rim between the ends of the segments of the soles $b$, $b'$; these ears are each pierced with a hole $d$. The fixed felly $e$ of the wheel (Figs. 4 to 6) is cased or encircled, in the ordinary manner, by an iron or other metal hoop or ring $e'$, and the felly and the ring or hoop are furnished with recesses $c^1$ $c^2$ respectively cut or sunk in their outer faces to receive the ears $c$ of the detachable rim. In line with these recesses the rim is moreover pierced by transverse holes through which pass bolts $f$ of which the heads bear on washer-plates suitablly fixed to the face of the felly opposite to that which is furnished with the recesses $c^1$. These bolt holes are shown central with the recessed portions $c^1$.

The attachment of the removable rim is simply effected by causing it to slide sidewise on the fixed felly $e$ until the ears $c$ enter their seats or recesses $c'$ and $c^2$. Nuts are screwed on the bolts $f$ which pass through the said ears $c$, and recesses $c'$ so that the detachable rim is securely locked to the wheel felly. In consequence of this mode of connection of the detachable rim with the fixed felly, the driving of the detachable rim by the wheel is effected without the possibility of any slipping or creeping, or any lateral separation as the result of an accident, and a tire may be detached with its rim and replaced by another rim-mounted tire with great facility.

Having thus described my invention, what I claim as such, and desire to secure by Letters Patent is:—

1. In a vehicle wheel, the combination with the felly, and a hoop or ring surrounding the same, said felly and ring each having a series of recesses in one edge, and the felly provided with transverse apertures, of a removable rim comprising a rim proper, a tire carried by the rim, circular sole plates secured to the inner face of the rim at the edges of the said rim, the sole plates being formed of sections with their ends spaced apart, apertured lugs provided with feet extending between the ends of the sections of the sole plates and fitting in the recesses of the felly and ring, bolts passing through the apertures of the felly and ring, and nuts on the ends of the bolt and engaging the said lugs.

2. In a vehicle wheel the combination with a felly having transverse apertures and recesses in one edge and a ring fitting on the felly and having recesses in one edge corresponding to the recesses of the felly, of a removable rim comprising a rim proper, a tire carried by the rim, circular sole plates secured to the inner face of the rim at its edges, lugs carried by the rim and fitting in the recesses of the felly and ring, bolts passing through the apertures of the felly and lugs, and nuts on the bolts and engaging the said lugs.

3. The combination of a wheel having a felly with a metallic ring thereon, the felly and ring being formed with recesses in one side, a removable tire-carrying rim having lugs fixedly secured thereto and projecting from one side thereof into the said recesses, and means for engaging the lugs and felly, whereby to detachably secure the rim to the felly.

4. In a vehicle wheel, the combination with a felly having recesses in one side, of a removable tire carrying rim, apertured ears engaging the recesses of the felly and provided with feet secured to the inner face of the removable rim, and bolts passing through the felly and ears.

5. In a vehicle wheel, the combination with a felly having recesses in one side, of a removable tire carrying rim, segmental plates secured to the inner faces of the rim with their ends spaced apart, apertured ears or lugs engaging the recesses of the felly and provided with feet extending between the segmental plates and secured to the rim, and bolts passing through the ears or lugs and the felly.

In testimony whereof I have signed my name to this specification, in the presence of two subscribing witnesses.

MARCEL ADOLPHE LEMERCIER.

Witnesses:
CHARLES DOUER,
GUSTAVE DUMONT.